May 7, 1935. A. VALLS Re. 19,566

WATER HEATING AND INFUSION APPARATUS

Original Filed Jan. 25, 1934 2 Sheets-Sheet 1

Inventor
A. Valls
by
W. E. Evans
Attorney.

May 7, 1935. A. VALLS Re. 19,566

WATER HEATING AND INFUSION APPARATUS

Original Filed Jan. 25, 1934 2 Sheets-Sheet 2

Inventor
A. Valls
by
W. E. Evans
Attorney.

Reissued May 7, 1935 Re. 19,566

UNITED STATES PATENT OFFICE 19,566

WATER HEATING AND INFUSION APPARATUS

Aurelio Valls, London, England

Original No. 1,981,402, dated November 20, 1934, Serial No. 708,262, January 25, 1934. Application for reissue February 27, 1935, Serial No. 8,512. In Great Britain January 26, 1933

7 Claims. (Cl. 53—3)

The invention relates to apparatus for heating liquids and more especially to apparatus of the kind adapted for the preparation of infusions, such as coffee, tea, medicinal solutions and the like.

The invention has among its objects to provide an improved and simplified heating apparatus in which infusions may be readily and rapidly prepared and an apparatus in which the electrodes are bare but the other elements of the electric system are so mounted that the casing is completely insulated, whereby the apparatus may be safely used.

According to the invention the container and the cover of the container are mounted within an insulating covering in such manner that the conducting parts of the system are effectually insulated.

The insulating covering of the container and the cover may be formed as a jacket of an electrically nonconducting material, conveniently a substance that may be moulded to a determined shape, such for example as a phenol formaldehyde condensation production which may be conveniently used in the form of a finely divided powder or otherwise.

According to the invention moreover the cover is adapted to be applied upon the container and the container provided with a reinforcement so that the pressure applied upon the cover for making an effective gas-tight joint with the container is transmitted to the reinforcement, so that thus no tensile stress is imposed upon the insulation that would tend to cause its fracture under the conditions of use of the apparatus.

The invention comprises the features hereinafter described in an apparatus according to the invention.

The invention is illustrated by way of example in the accompanying drawings, in which Figure 1 is an elevation of an apparatus constructed according to the invention shown partly in vertical cross-section.

Figure 2:
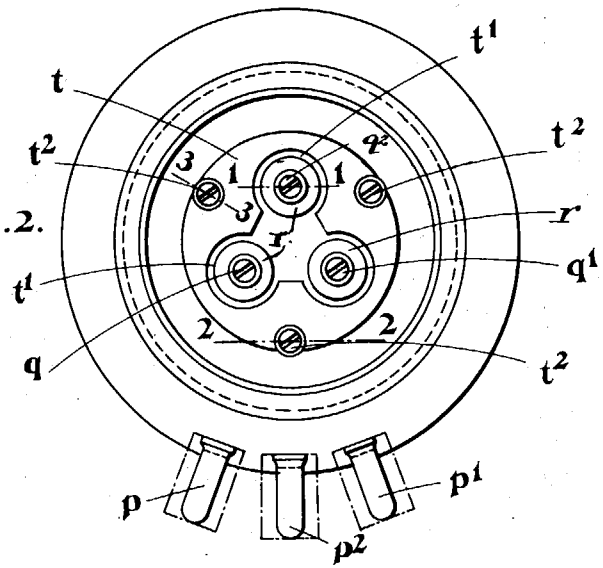
Figure 2 is a plan view corresponding to Figure 1, with the cover and stirrup of the apparatus removed.

In carrying the invention into effect as illustrated in the accompanying drawings in the construction of an apparatus for heating liquids and particularly for the preparation of infusions, such as infusions of coffee, I provide the cylindrical container *a* advantageously of non-corrodible metal, such as stainless steel, German silver or the like, having moulded exterior to it a surrounding jacket *b* of a phenol formaldehyde condensation product consolidated under heat and pressure within a mould in the usual manner. I similarly provide a cover *c* of suitable metal such as stainless steel, or German silver, having moulded on the exterior an insulating jacket *d* of a substance similar to the jacket *b*. The jacket *b* is reinforced by a reinforcement *e* formed of a flat strip of metal such as steel of a substantially U-shape which is moulded with the insulating jacket, the upper ends $e^1$ being diverted outwardly and having brazed or welded to them on their respective inner and outer faces an inner ring $e^2$ and an outer ring $e^3$. The container *a* is formed at the upper end with a narrow outwardly extending flange $a^1$. The container *a* with the reinforcement *e* and the parts carried by it are set into the mould which is charged with the phenol formaldehyde condensation product conveniently in the form of fine powder and the moulding of the insulating jacket carried out under the conditions of pressure and temperature such as are usual for consolidation whereby the respective parts are integrally incorporated.

It will be understood that in the illustrated construction the lower part $e^4$ of the reinforcement passes under the base part $a^2$ of the container and that above the flange $a^1$ the container is of larger diameter for the accommodation of the outwardly and upwardly extending flange $f^1$ of a dish or tray *f* soldered, welded or otherwise secured to a tubular spindle *g* closed at its upper end and open at its lower end which is provided with an insulated head as hereinafter described, and is provided with orifices $f^2$ at the upper part immediately above the dish *f*. A loosely mounted and perforated strainer *h* is applied over the upper end of the tubular spindle *g* so that it normally rests upon the dish *f*. An elastic packing ring *i* of rubber, asbestos or other material is mounted on the annular seat of the flange $f^1$. An upper perforated strainer *j* is provided with a seating flange $j^1$ adapted to contact with the top of the packing ring $i$. The cover $c$ is similarly moulded with an insulating jacket $d$ of similar material to that of the insulating jacket $b$ and is advantageously of a substantially conical shape so as to form a compartment $k$ into which the infusion passes and from which it issues through the outlet pipe $l$, detachably connected to the cover $c$ and jacket $d$. At the top of the cover $c$ a curved metal plate $c^1$ advantageously of a circular curvature is integrally formed for the accommodation of the end $m^1$ of the screw-threaded spindle $m$ which is carried in the boss $n^1$ of a stirrup $n$ pivotally connected at $n^2$ to the upper part of the reinforcement $e$.

It will be understood that by means of the stirrup $n$ exerting a downward pressure on the cover $c$ the cover is held in gas-tight connection with the container $a$ and owing to the resulting tensile stress created in the reinforcement $e$ no part of the jackets $b$ and $d$ are subjected to injurious tensile stress in the use of the apparatus.

Figures 3, 4, 5, 6, 7:
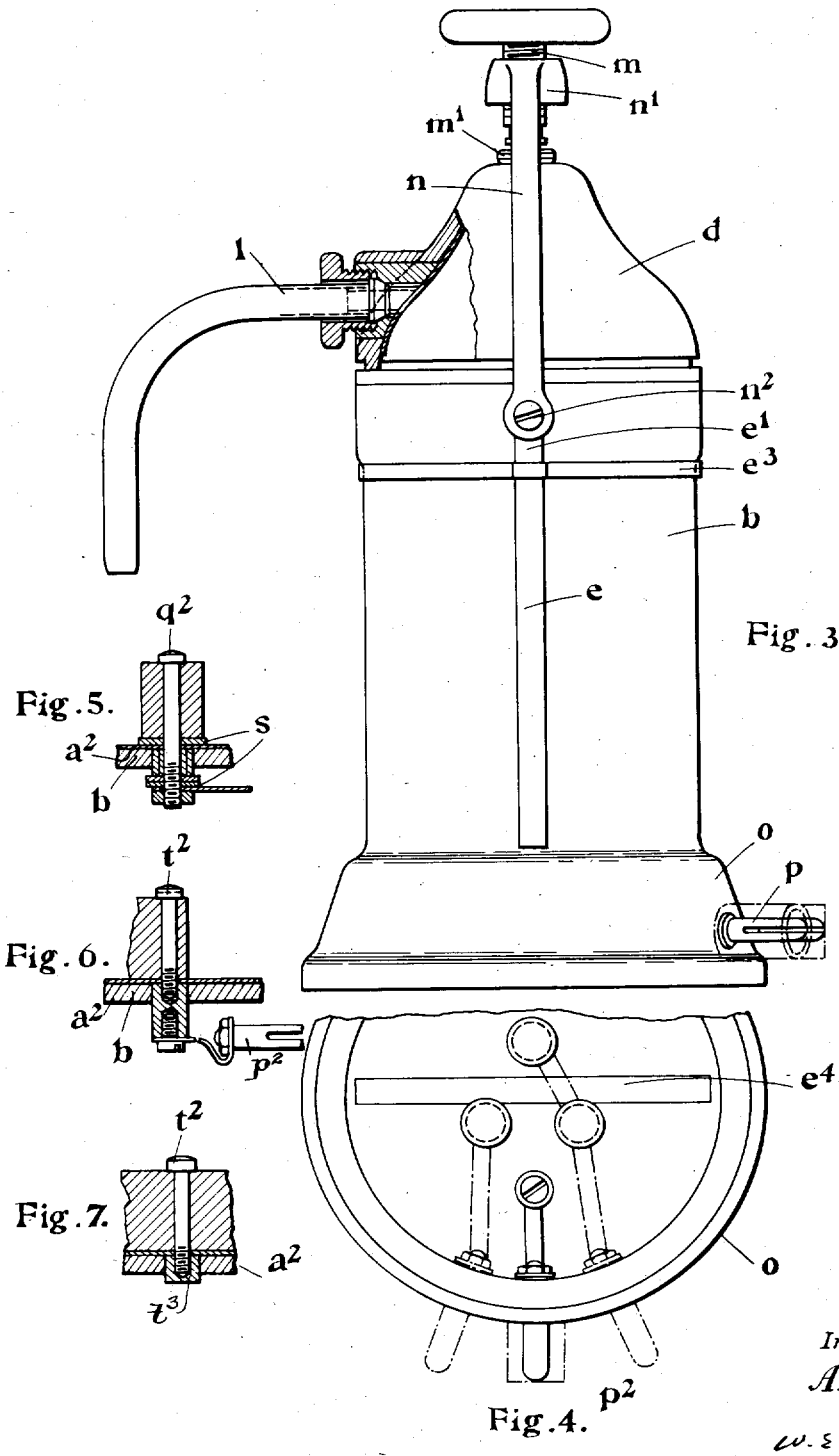
Figure 3 is a side elevation partly in vertical section.
Figure 4 is a reverse plan view corresponding to Figure 3.
Figure 5 is a section on the line 1—1 of Figure 2 showing the method of connection of the electrodes and the bottom of the container.
Figure 6 is a section on the line 2—2 of Figure 2 showing the method of connection of the third terminal plug to the electrode.
Figure 7 is a section on the line 3—3 of Figure 2 showing the method of connection of the pole member to the bottom of the container.

The container $a$ is mounted on a hollow base plate $o$ of the insulating substance to which are secured three electrical plug contacts $p$, $p^1$, $p^2$ extending within insulated sockets from the base plate $o$ and being insulated from the container $a$ by insulating sleeves of ebonite or the like, the contact $p^2$ being secured by metallic connection to the container $a$ (Figure 4). The insulated plug contacts $p$, $p^1$ are connected beneath the hollow base plate $o$ by strip metal connections or the like advantageously adapted to serve as a fuse to the lower extremities of corresponding screws $q$, $q^1$ which project in insulating sleeves through the bottom of the container $a$ and jacket $b$. A third screw $q^2$ similarly provided is connected by strip metal to one of the two other screws $q$, $q^1$. The screws $q$, $q^1$, $q^2$ pass through centrally bored carbon or graphite electrodes $r$ mounted to extend upwardly within the container, the heads of the screws bearing against the upper end surfaces of the carbon or graphite electrodes $r$ to hold them in an upstanding position on the base part $a^2$ of the container $a$ when the lower extremities of the screws $q$ are engaged by nuts or the like. Washers $s$ of insulating material such as rubber, ebonite or the like are provided on the screws to ensure insulation of the electrodes from the metallic container $a$.

On the base part $a^2$ of the container $a$ a pole member $t$ formed of a block of conducting material such as graphite or the like is provided, the pole member being formed with recesses $t^1$ or holes corresponding to the number of electrodes and being mounted in such manner on the base part $a^2$ of the container $a$ that the electrodes $r$ project upwardly in the recesses or holes $t^1$. Where three electrodes are provided they may be mounted at equal distances apart, the pole member $t$ which may be provided of substantially circular cross-section surrounding them, and being for the purpose provided with corresponding recesses or holes so that a narrow channel is maintained around each electrode between the electrode and the pole member. The pole member $t$ is maintained in position on the base part $a^2$ of the container $a$ by means of screws $t^2$ as illustrated in Figure 7, to one of which is connected the terminal plug $p^2$ as shown in Figure 6, the screws $t^2$ being engaged in sockets $a^3$ welded or otherwise secured on the base part $a^2$ of the container $a$ (Figure 7), the screws $t^2$ advantageously fitting in three or more vertically disposed peripheral recesses or grooves correspondingly provided in the pole member $t$.

The recesses or holes $t^1$ in the pole member $t$ may be joined together by cutting away the dividing wall at the centre of the pole member. In the gap thus formed is received the lower end of the hollow spindle $g$ closed at the top and insulated from the pole member in which it is located by a hollow cap $g^1$ of an insulating substance such as ebonite or the like advantageously screwed thereon, and tapering towards the bottom, being transversely grooved at $g^2$ at the bottom to permit of the passage of liquid or vapour through the spindle $g$.

In the use of three carbon electrodes $r$ as hereinbefore described the rapidity of boiling of the liquid in the container may be varied by connecting up various combinations of the plug contacts $p$, $p^1$ and $p^2$ to the source of current; four different degrees of heat are possible—low—medium—strong—high. This variation is made possible owing to the particular form of the pole member $t$ surrounding the electrodes, the resistance to the passage of electric current across the channels surrounding the electrodes varying for different combinations of the connections to the plug contacts. Thus the minimum heat is obtained when the current is passed through the container by connecting the positive pole of the source of current to the two connected electrodes and the negative pole to the single electrode. Thus the current paths between the two connected electrodes and the single electrode are relatively extended since they traverse the wide gap between the corresponding holes in the graphite pole member. The medium heat is obtained when the positive pole is connected to the contact in electrical connection with the container and the negative pole remains connected to the single electrode. In this case the current path is from the pole member to the single electrode across the narrow channel surrounding the electrode. Strong heat is obtained with the positive pole connected as for medium heat and the negative pole is connected to the two connected electrodes, the paths of the current traversing the substantially circular channels around the two connected electrodes. Maximum heat is obtained with the positive pole connected as before and two negative poles connected respectively to the connected electrodes and the single electrode. In this case the paths of the current traverse all the channels formed around the electrodes.

In operation ground coffee is placed on the strainer $h$ within the dish $f$, the latter being then placed in position in the container $a$ which has been previously filled with water to the required level. The covering member comprising the cover $c$ and jacket $d$ is then secured on the top of the container $a$ and clamped down thereon by means of the stirrup $n$, thus securing a gas-tight joint. The current is then switched on and the water in the container $a$ boils and is forced upwardly by the pressure of the steam generated in the container through the coffee in the dish $f$ and, passing through the perforated strainers $h$ and $j$ into the space $k$ passes out through the downwardly extending outlet pipe $l$ into a receptacle placed beneath.

It will thus be understood that the coffee grounds are held within a chamber formed between the strainer $h$ within the dish $f$ and the upper perforated strainer $j$. Branch tubes of the outlet pipe $l$ permit of two cups being filled at the same time.

It will be understood that the invention is not confined to the particular construction of apparatus hereinbefore described, nor to the particular disposition of its component parts, nor to the materials used in its construction. Thus the apparatus may be formed of stainless steel, nickel-plated steel, German silver, or any other non-corrodible and non-oxidizable metal, and/or it may be insulated by glass, or other insulating substance internally or externally or may be mounted on an insulating plate in any other manner than as hereinbefore described.

It will be understood, furthermore, that the invention is not limited to the particular electrical circuits as hereinbefore described which may differ inter alia according to the number of electrodes, the particular forms of the pole member or electrodes, the current used, whether direct current or alternating current, or the voltage, which may be as low as 80 or as high as 250.

These voltages may furthermore be used without any danger of electric shock to the person using the apparatus owing to the electrical insulation of the casing of the apparatus and the other component parts thereof.

The apparatus further may be used purely as a heater for milk, water or other liquids or in the preparation of other infusions such as tea or the like, and the heating elements may be applied to a container serving merely as a kettle or saucepan.

The liquid in the container is purified not only by natural sterilization due to heating and by the continuous passage of current between the carbon electrodes, but also by ozonization between the poles and by the electronization.

Figure 1:
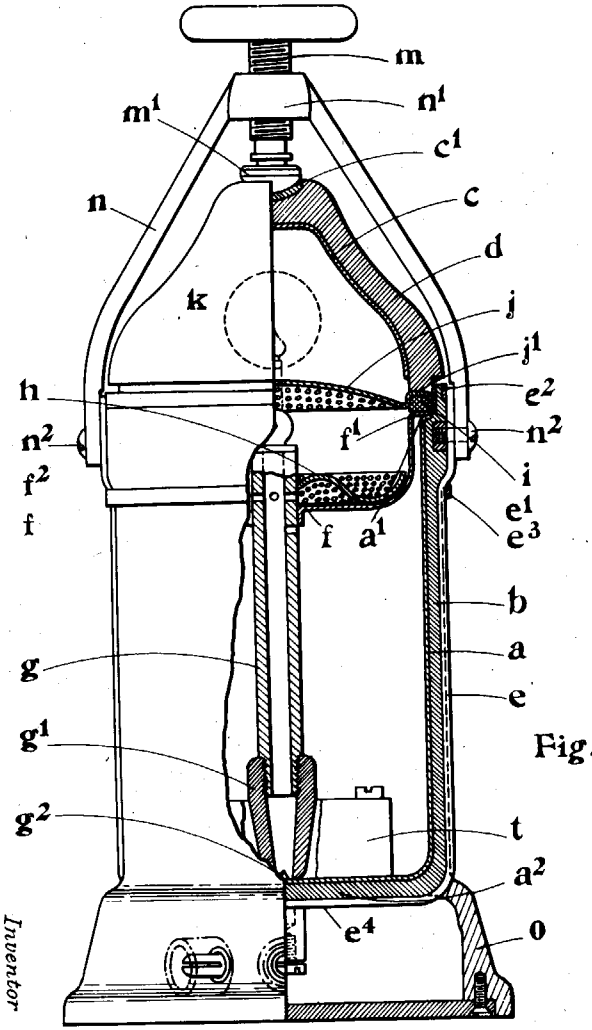

To facilitate the production of large quantities of coffee from the apparatus, the spindle *g* and dish *f*, together with the strainers *h* and *j* may be provided in duplicate in which case also the spindle *g* may be extended to pass through the upper strainer which is provided with a hole for the purpose, the upper extension of the spindle *g* shown in dotted lines in Figure 1 being reduced in cross-section and advantageously provided with a pointed end. In this way the second dish charged with fresh coffee may be quickly and easily placed in position in the apparatus when the coffee in the first dish is spent.

Further to facilitate the removal of the dish and to avoid the necessity of touching the inner heated metallic parts of the apparatus, the spindle *g* may be provided at its upper end with an annular groove within which there may be engaged the bifurcated end of a metallic strip provided with the apparatus, the other end of which strip may advantageously be formed as a cup or measure for charging the coffee into the apparatus.

What I claim is:

1. Apparatus for heating liquids, more especially for preparing infusions, such as of coffee, comprising a liquid container which is electrically non-conducting at least exteriorly, a closure for the container, a plurality of electrodes in the bottom of the container, in contact with the liquid, for heating the liquid by its resistance to the electrolytic conduction of current, and a vertically disposed, liquid elevating tube insulated from the electrodes and having its lower end close to and between them.

2. Apparatus for heating liquids, more especially for preparing infusions, such as of coffee, comprising a metallic container for the liquid, a closure member for the container, electrical heating means mounted within the container and an insulating jacket of an electrically non-conductive material surrounding the container a plurality of electrodes in the bottom of the container, in contact with the liquid, for heating the liquid by its resistance to the electrolytic conduction of current, and a vertically disposed, liquid elevating tube having its lower end close to and between the electrodes and insulated from them.

3. Apparatus for heating liquids, more especially for preparing infusions, such as of coffee, comprising a metallic container for the liquid, a closure member for the container, electrical heating means mounted within the container and an insulating jacket of an electrically non-conductive mouldable material surrounding the container.

4. Apparatus for heating liquids, more especially for preparing infusions, such as of coffee, comprising a metallic container for the liquid, a closure member for the container, electrical heating means mounted within the container, an insulating jacket of an electrically non-conductive material surrounding the container, a reinforcement for the container and clamping means for the cover movably secured to the reinforcement for securing an effective gas-tight joint between the cover and the container.

5. Apparatus according to claim 4, in which the reinforcement for the container comprises a U-shaped strip of metal moulded into the insulating cover to lie in a substantially vertical plane and internal and external rings secured to the U-shaped strip and disposed in a plane transversely of the plane of the strip.

6. Apparatus for heating liquids, more especially for preparing infusions, such as of coffee, comprising a metallic container for the liquid, a closure member for the container, a receptacle for the substance from which the infusion is to be prepared mounted in the upper part of the container, strainers positioned above and below said substance, liquid heating electrodes mounted in the lower part of the container, and adapted to be electrically connected to a source of current outside the container, and an insulating jacket of an electrically nonconductive mouldable material within which the container is mounted.

7. Apparatus for heating liquids, more especially for preparing infusions, such as of coffee, comprising a container for the liquid, a receptacle mounted therein for holding the substance from which the infusion is to be made, several electrodes mounted in the container and adapted to heat liquid in the container by completing a circuit through said liquid, and means for connecting said electrodes in different circuit combinations to vary the current paths between electrodes and to vary the electrode areas, thus providing various degrees of heat.

AURELIO VALLS.